United States Patent
Sieksmeier (10) Patent No.: US 12,110,186 B2
(45) Date of Patent: Oct. 8, 2024

(54) OVERHEAD CONVEYOR SYSTEM AND METHOD FOR CONVEYING OVERHEAD ADAPTERS AND OVERHEAD CONVEYOR FACILITY INCLUDING SUCH AN OVERHEAD CONVEYOR SYSTEM

(71) Applicant: Dürkopp Fördertechnik GmbH, Bielefeld (DE)

(72) Inventor: Dirk Sieksmeier, Spenge (DE)

(73) Assignee: DÜRKOPP FÖRDERTECHNIK GMBH, Bielefeld (DE)

(*) Notice: Subject to any disclaimer, the term of this patent is extended or adjusted under 35 U.S.C. 154(b) by 42 days.

(21) Appl. No.: 17/964,209

(22) Filed: Oct. 12, 2022

(65) Prior Publication Data
US 2023/0114187 A1    Apr. 13, 2023

(30) Foreign Application Priority Data
Oct. 13, 2021   (DE) .................... 10 2021 211 571.3

(51) Int. Cl.
*B65G 17/20*   (2006.01)
*B65G 43/08*   (2006.01)
*B65G 47/61*   (2006.01)

(52) U.S. Cl.
CPC ............ *B65G 17/20* (2013.01); *B65G 43/08* (2013.01); *B65G 47/61* (2013.01)

(58) Field of Classification Search
CPC ................... B65G 17/20; B65G 47/61; B65G 2201/0229; B65G 19/025; B65G 43/08
See application file for complete search history.

(56) References Cited

U.S. PATENT DOCUMENTS 4,875,416 A    10/1989  Duce
4,991,719 A *   2/1991  Butcher .................... G06F 7/08
                                                 198/465.4
(Continued)

FOREIGN PATENT DOCUMENTS

DE    9406059 U1    8/1995
DE   69205338 T2    5/1996
(Continued)

*Primary Examiner* — Mark A Deuble
(74) *Attorney, Agent, or Firm* — McGlew and Tuttle, P.C.

(57) ABSTRACT

An overhead conveyor system for conveying overhead adapters along a conveying direction includes a first overhead conveyor line, a functional overhead conveyor line connected in terms of conveying technology to the first overhead conveyor line, which functional overhead conveyor line has a discharge element for discharging overhead adapters from the overhead conveyor system, a separating unit arranged upstream of the functional overhead conveyor line for feeding the overhead adapters separately into the functional overhead conveyor line, a first identification unit arranged upstream of the separating unit for identifying overhead adapters to be discharged, a second identification unit arranged downstream of the separating unit for identifying overhead adapters to be discharged, and a control unit for automatically conveying and discharging the overhead adapters, wherein the control unit is in signal connection with the discharge element, the first identification unit, the second identification unit and the separating unit.

20 Claims, 2 Drawing Sheets

(56) References Cited

U.S. PATENT DOCUMENTS

| | | | | |
|---|---|---|---|---|
| 5,072,822 A * | 12/1991 | Smith | ...................... | G06F 7/08 |
| | | | | 198/465.4 |
| 6,439,366 B1 * | 8/2002 | Matkovich | ................ | B07C 5/02 |
| | | | | 198/463.6 |
| 9,296,561 B2 * | 3/2016 | Wend | ................... | B65G 1/1378 |
| 9,815,635 B2 * | 11/2017 | Sieksmeier | ............ | B65G 43/08 |
| 11,180,322 B2 * | 11/2021 | Gallati | ................. | B65G 19/025 |
| 11,383,938 B2 * | 7/2022 | Merten | ................. | B65G 47/61 |

FOREIGN PATENT DOCUMENTS

| | | |
|---|---|---|
| DE | 29709547 U1 | 8/1997 |
| DE | 19536313 C2 | 7/2000 |
| DE | 10039394 C1 | 9/2001 |
| DE | 102004018569 A1 | 11/2005 |
| DE | 102005006455 A1 | 8/2006 |
| DE | 102010033905 A1 | 2/2012 |
| DE | 102014201301 A1 | 7/2015 |
| EP | 1293455 A1 | 3/2003 |
| EP | 2910499 A1 | 8/2015 |
| WO | 2021127715 A1 | 7/2021 |

* cited by examiner

OVERHEAD CONVEYOR SYSTEM AND METHOD FOR CONVEYING OVERHEAD ADAPTERS AND OVERHEAD CONVEYOR FACILITY INCLUDING SUCH AN OVERHEAD CONVEYOR SYSTEM

CROSS-REFERENCES TO RELATED APPLICATIONS

This application claims the priority of German Patent Application, Serial No. DE 10 2021 211 571.3, filed Oct. 13, 2021, the content of which is incorporated herein by reference in its entirety as if fully set forth herein.

FIELD OF THE INVENTION

The invention relates to an overhead conveyor system and a method for conveying overhead adapters, and to an overhead conveyor facility including such an overhead conveyor system.

BACKGROUND OF THE INVENTION

It is known to convey and pick individual goods by means of overhead adapters in an overhead conveyor facility. As part of the picking process, the individual goods are sorted according to orders, temporarily stored if necessary and conveyed to packing places for packing the individual goods for dispatch. Sorting and/or temporary storage of the individual goods takes place in at least one temporary storage device, from which the individual goods belonging to an order are discharged in a targeted manner and conveyed to the packing places. This process is also described as a picking process. In order to reliably identify the individual goods to be discharged in the temporary storage device, it is necessary to convey the overhead adapters along the conveying direction at a required minimum spacing. This reduces the conveying rate, i.e. the number of overhead adapters conveyed per unit of time. In particular, the flow of goods in the overhead conveyor is unnecessarily reduced if the discharge rate is low.

SUMMARY OF THE INVENTION

It is an object of the present invention to improve the picking of hanging conveyed individual goods, in particular to increase the throughput of goods, in particular also at low discharge rates, and in particular to guarantee a reliable discharge process.

According to the invention, this object is achieved by an overhead conveyor system for conveying overhead adapters along a conveying direction, comprising a first overhead conveyor line, a functional overhead conveyor line connected in terms of conveying technology to the first overhead conveyor line and having a discharge element for discharging overhead adapters from the overhead conveyor system, a separating unit arranged upstream of the functional overhead conveyor line for feeding the overhead adapters separately into the functional overhead conveyor line, a first identification unit arranged upstream of the separating unit for identifying overhead adapters to be discharged, a second identification unit arranged downstream of the separating unit for identifying overhead adapters to be discharged, a control unit for automatically conveying and discharging the overhead adapters, wherein the control unit is in signal connection with the discharge element, the first identification unit, the second identification unit and the separating unit, by an overhead conveyor facility comprising at least one overhead conveyor system, and by a method for conveying overhead adapters in an overhead conveyor system, along a conveying direction, comprising the method steps of suspended conveyance of at least one overhead adapter along a first overhead conveyor line of the overhead conveyor system, identifying overhead adapters to be discharged by means of a first identification unit, transmitting a first identification signal from the first identification unit to a control unit, generating a control signal by means of the control unit, wherein a first control signal is generated when at least one overhead adapter to be discharged has been identified by means of the first identification unit, a second control signal is generated if no overhead adapter to be discharged has been identified by means of the first identification unit, transmitting the control signal from the control unit to a separating unit, separating the overhead adapters by means of the separating unit, wherein a conveying distance between two adjacent overhead adapters is set in dependence on the control signal such that a first conveying distance due to the first control signal is greater than a second conveying distance due to the second control signal, identifying overhead adapters to be discharged by means of a second identification unit, transmitting a second identification signal from the second identification unit to the control unit, generating a discharge signal by means of the control unit when an overhead adapter to be discharged has been identified by means of the second identification unit, transmitting the discharge signal from the control unit to a discharge unit, discharging the overhead adapter to be discharged from the overhead conveyor system by means of a discharge element.

According to the invention, it has been recognized that from a flow of individual goods, each of which is conveyed in a suspended manner by means of an overhead adapter, only a portion is discharged from an overhead conveyor system and conveyed, for example, to a packing place. In order to be able to reliably discharge this portion of the individual goods, it is necessary to ensure a minimum conveying distance along the conveying direction of the overhead adapters in order to guarantee reliable identification and subsequent discharge of the overhead adapters concerned. The minimum conveying distance results in particular from the discharge process of the overhead adapters and in particular from a discharge element that is used for the discharge process. In particular, the discharge element is switched between a discharge position and a conveying position. The faster the switching process takes place, the smaller the minimum conveying distance can be set. The smaller the minimum conveying distance, the higher the conveying rate with the overhead conveyor facility. However, it has also been recognized that this minimum conveying distance is not required for the overhead adapters that are not to be discharged. Thus, overhead adapters that are not to be discharged can be conveyed at a smaller conveying distance and guided past the discharge element. In this way, the conveying rate can be increased whenever no discharge process takes place. In particular, the overall conveying rate is thereby increased in the case of low discharge rates, for example of less than 50%, in particular of less than 40%, in particular of less than 30%, in particular of less than 20%, in particular of less than 15% and in particular of at most 10%. The discharge rate is understood to mean the number of overhead adapters to be discharged relative to the total number of overhead adapters considered and/or identified in the overhead conveyor system.

According to the invention, it has thus been recognized that the conveying density of the overhead adapters can be variably adjusted along the conveying direction, in particular in dependence on an upcoming discharge process and in particular in dependence on whether the next overhead adapter is to be discharged or not.

According to the invention, this identification takes place in two stages by means of a first and a second identification unit. In a first stage, the first identification unit identifies whether there is at least one overhead adapter in a lot of overhead adapters that is to be subsequently discharged. The first identification unit thus enables a preliminary detection. In particular, the preliminary detection takes place before the conveying distance between two adjacent overhead adapters is variably set.

A separating unit is arranged downstream of the first identification unit, wherein the separating unit enables the overhead adapters to be conveyed separately at different conveying distances. In the event that no overhead adapters to be discharged have been identified by the first identification unit, the separation takes place with a conveying distance that is smaller than the minimum conveying distance. This increases the conveying rate. In the event that at least one overhead adapter to be discharged has been identified by means of the first identification unit, the overhead adapters are subsequently separated at the required minimum conveying distance by means of the separating unit and conveyed in the functional overhead conveyor line. This ensures reliable discharge of the overhead adapters by means of the discharge element. The minimum conveying distance results in particular from the conveying speed along the functional overhead conveyor line and/or the discharge element. A corresponding control signal is generated by the control unit and transmitted to the separating unit.

In a second stage, the overhead adapters are identified individually by means of a second identification unit. If the identified overhead adapter is intended for discharge because it belongs to an order to be picked, a discharge signal is generated and transmitted to the discharge element for discharging the overhead adapters.

The identification units are designed such that they read out data from the overhead adapter and, in communication with a control unit, identify whether the respective overhead adapter is conveying individual goods that are waiting to be discharged. In particular, overhead adapter data is stored by means of the identification means and can be read out by the identification units, in particular without contact, in particular as the overhead adapters pass by. The hanging adapter data contain information in particular about the individual goods conveyed and in particular about the order which they belong to. If the individual goods conveyed on the overhead adapter belong to an order to be picked, the individual goods, i.e. the overhead adapter, is to be discharged from the overhead conveyor system.

It is essential that the control unit enables an automated conveying of the overhead adapters in the overhead conveyor system and an automated discharge of overhead adapters from the overhead conveyor system. For this purpose, the control unit is in signal connection with the discharge element, the identification units and the separating unit, in particular in bidirectional signal connection.

Due to the fact that the conveying distance can be set variably depending on the overhead adapters conveyed in the region of the discharge element, both the required minimum conveying distance for the reliable discharge of overhead adapters and a reduced conveying distance for overhead adapters that are not to be discharged, and thus an increased conveying rate, can be guaranteed. Conveying and picking of individual goods is possible reliably and at an overall increased conveying rate.

According to the invention, adaptive adjustment of the conveying distance is possible depending on the overhead adapter identified in each case, wherein this adjustment takes place particularly efficiently due to the preliminary detection by means of the first identification unit, which is connected upstream of the separating unit.

An overhead conveyor system in which the overhead conveyor system is designed as a circulating storage device is particularly efficient. A circulating storage device allows endless circulating temporary storage of overhead adapters. Such circulating storage devices are also referred to as rotating storage systems.

An overhead conveyor system comprising a second overhead conveyor line which is connected in terms of conveying technology to the functional overhead conveyor line and which is connected in terms of conveying technology to the first overhead conveyor line, in particular by means of a connecting conveyor line, enables an uncomplicated constructive design.

An overhead conveyor system comprising an insertion element for inserting overhead adapters into the overhead conveyor system, wherein the insertion element is arranged in particular on a connecting conveyor line, allows flexible insertion of overhead adapters into the overhead conveyor system.

An overhead conveyor system in which the separating unit is switchable by means of the control unit such that a conveying distance oriented along the conveying direction between two adjacent overhead adapters can be set variably simplifies the variable setting of the conveying distance.

An overhead conveyor system comprising an advance region of the first overhead conveyor line, which advance region is arranged between the first identification unit and the separating unit, wherein the advance region has a length along the conveying direction such that a plurality of overhead adapters can be arranged simultaneously in the advance region, simplifies the detection of individual goods to be discharged. A group of overhead adapters is arranged in an advance region and the overhead adapters are identified by the first identification unit, in particular when they enter the advance region. By defining the length of the advance region, the number of overhead adapters that can be arranged simultaneously within the advance region is determined. In this context, it is advantageous if the number of overhead adapters, i.e. the length of the advance region, is designed in particular such that, as expected, a maximum of one overhead adapter to be discharged will be arranged in the advance region. The length of the advance region can thus be determined in particular in dependence on the discharge rate. If the discharge rate is 10%, for example, this means that on average one in ten overhead adapters is discharged. In this case, the advance region has a length in the conveying direction such that ten overhead adapters can be arranged in the advance region at the same time. If the advance region is chosen too small, there is a risk that the switchover to the minimum conveying distance will occur too late and therefore an overhead adapter to be discharged will not be reliably discharged. If the advance region is chosen too large, there is a high risk that several overhead adapters to be discharged are arranged in the advance region. This means that the minimum conveying distance is applied too often, even though, for example, a number of overhead adapters that are not to be discharged are conveyed between two overhead adapters to be discharged. If the advance region is chosen too large, the effect of temporarily increasing the conveying rate according to the invention will vanish.

In particular, the length of the advance region corresponds to the distance along the conveying direction between the first identification unit and the separating unit.

It is particularly advantageous to arrange the first identification unit at the overhead conveyor system so that it can be variably fixed along the conveying direction. This makes it possible in particular to adjust the length of the advance region variably, in particular in dependence on the expected discharge rate. The discharge rate can vary in particular with the article stock and/or with the number of overhead conveyor systems in an overhead conveyor facility. By variably defining the advance region, its size can be adapted to the current discharge rate, thus ensuring particularly high efficiency, i.e. a particularly high efficient conveying rate. This can be done manually, for example. For example, fastening devices for the first identification unit can be provided in a predefined grid. In addition or alternatively, the variable fastening of the first identification unit can also be carried out continuously and/or in an automated manner, for example by means of a displacement drive.

An overhead conveyor facility comprising at least one overhead conveyor system substantially has the advantages of the overhead conveyor system, to which reference is hereby made.

The method as described above has the advantages of the overhead conveyor system, to which reference is hereby made. It is essential that, in particular, in dependence on the first identification signal, a first or second control signal is generated by the control unit depending on whether an overhead adapter to be discharged has been identified. If this is the case, the conveying distance between the overhead adapters is extended by means of the separating unit to the required minimum conveying distance in order to ensure reliable discharge of the corresponding overhead adapter.

A method in which overhead adapter data is detected by means of the identification units in a contactless manner, in particular while passing by simplifies the identification of overhead adapters to be discharged. For this purpose, in particular identification means are provided on the overhead adapters, in particular an RFID chip or a graphic code such as a bar code or a QR code.

Accordingly, the identification units are designed as transponder readers to communicate with the RFID chip or as code readers to capture the barcode or QR code.

In particular, an RFID chip has a width, in particular a diameter, along the conveying direction of the overhead conveyor facility that is smaller than a width of the overhead adapter that is also oriented along the conveying direction. This results in a minimum distance between two adjacent RFID chips, which are in particular each arranged to be integrated in the overhead adapter, along the conveying direction. It is advantageous if the first identification unit, which is arranged upstream of the separating unit, has a higher reading rate than the second identification unit. In particular, the first identification unit is suitable to perform more reading operations per time unit than the second identification unit. This is possible in particular by a specific adaptation of the magnetic field distribution for the first identification unit.

A method in which the overhead adapters can be conveyed in a circulating manner, in particular endlessly, in the overhead conveyor system enables advantageous and space-saving temporary storage of the overhead adapters.

A method comprising deactivating the second identification unit by transmitting a deactivation signal from the control unit to the second identification unit when the first control signal is generated avoids an unintended discharge of an overhead adapter. In particular, it is ensured that the discharge element does not unintentionally receive a discharge signal. In particular, this prevents a collision because, for example, a discharge process is initiated even though the overhead adapters are being conveyed at too small a conveying distance.

A method in which the overhead adapter to be discharged is included in a list with the first control signal and is removed from this list again when the overhead adapter has been identified by means of the second identification unit simplifies the, in particular automated, monitoring of the overhead adapters to be discharged. A list in which overhead adapters are entered and from which the overhead adapters are removed again is in particular an electronic list which is maintained in particular automatically, in particular in a central control unit. This makes it possible to derive directly whether, and if so, how many, overhead adapters are provided for discharge. The adaptation of the conveying distance, in particular in an automated manner, is thus simplified. The method can be carried out reliably and without errors.

A method comprising automatically generating the second control signal when the last overhead adapter has been removed from the list simplifies an automated switching to the operating mode at an increased conveying rate. In particular, the second control signal is generated whenever the list of overhead adapters to be discharged has been emptied. In particular, this is the case when all overhead adapters to be discharged have first been detected by the first identification unit and entered in the list and then detected by the second identification unit and a corresponding discharge signal transmitted to the discharge unit. The overhead adapters detected by the second identification unit are deleted from the list. When the last overhead adapter has been deleted from the list, i. e., has been removed, the list is empty. In particular, this is ensured by the fact that the second control signal is only generated if all overhead adapters to be discharged have already been detected by the second identification unit. A malfunction of the overhead conveyor system is thus excluded. In particular, this method enables an increased conveying rate, since the switchover to conveying at the second conveying distance is performed in an automated manner.

Both the features specified in the patent claims and the features specified in the following embodiment example of an overhead conveyor system according to the invention are each suitable, either on their own or in combination with one another, for further developing the subject matter according to the invention. The respective combinations of features do not represent any restriction with respect to the further embodiments of the subject matter of the invention, but are essentially merely exemplary in character.

Further features, advantages and details of the invention will be apparent from the following description of an embodiment example based on the drawing.

DESCRIPTION OF THE PREFERRED EMBODIMENT

Figure 1:
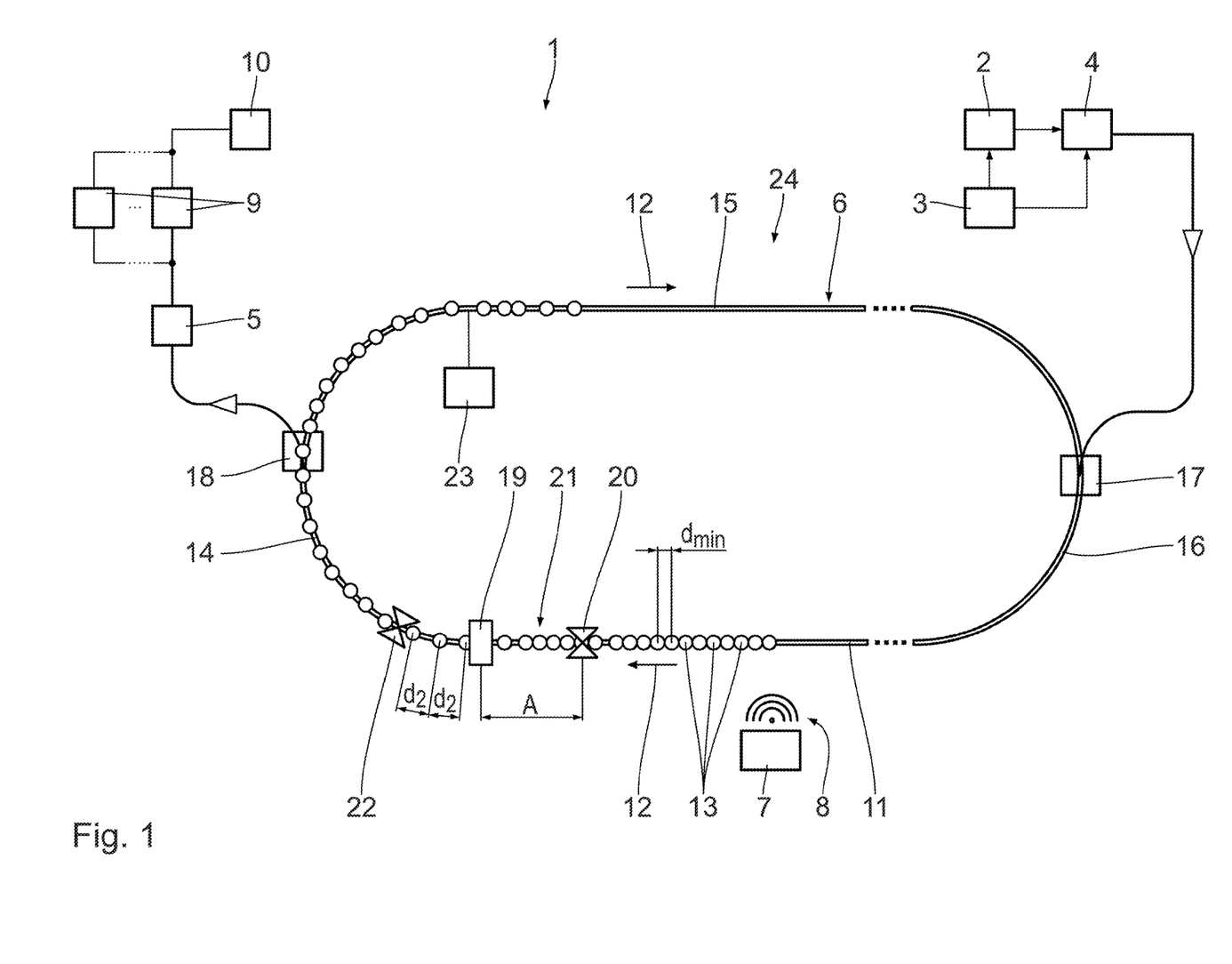
FIG. 1 shows a schematic illustration of an overhead conveyor system of an overhead conveyor facility according to the invention.
Figure 2:
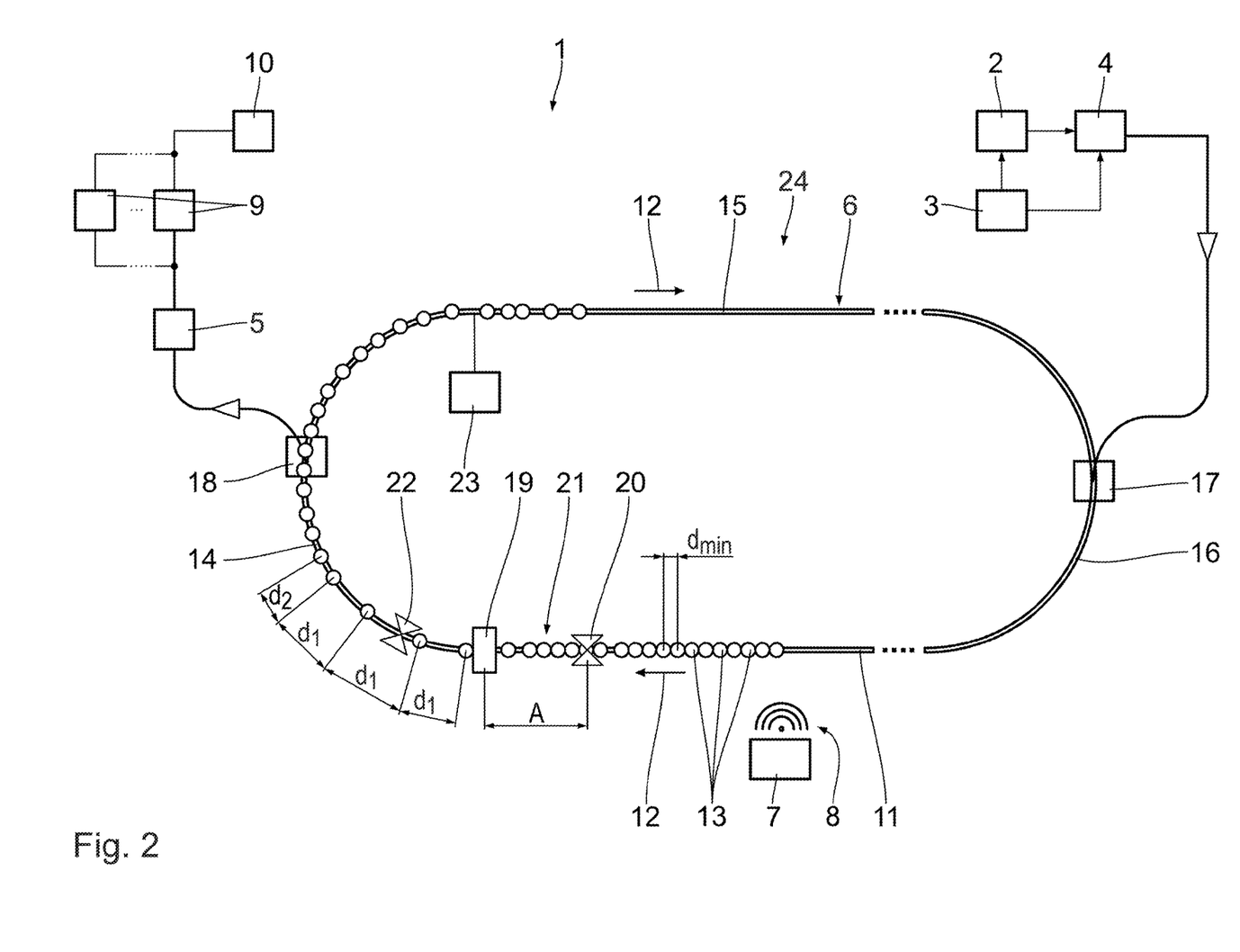
FIG. 2 shows an illustration of the overhead conveyor system corresponding to FIG. 1, in which the overhead adapters are conveyed at a minimum conveying distance in the region of a separating unit.

An overhead conveyor facility shown schematically in FIGS. 1 and 2 serves to convey and pick individual goods to form orders. The individual goods are also referred to as articles. The overhead conveyor facility 1 comprises a warehouse 2 in which the individual goods are stored. The warehouse 2 can be designed as a manual warehouse or as an automatic warehouse. The overhead conveyor facility 1 also has an incoming goods zone 3, via which the individual goods are fed to the overhead conveyor facility 1, in particular from an external source. Returned goods can also be fed to the incoming goods zone 3.

The incoming goods zone 3 is connected to the warehouse 2 in terms of conveying technology. The conveying connection is implemented, for example, by a conveyor belt or a manual feed of the individual goods, which can also be present in particular in packages in the incoming goods zone 3.

The overhead conveyor facility 1 also comprises a feed station 4 at which the individual goods are loaded into a conveyor bag, for example. In particular, exactly one individual product is loaded into a conveyor bag. The conveyor bags are loaded with one individual product at a time. The feed station is also referred to as the loading station. The individual goods that are loaded into the conveyor bags are also referred to as lying goods. The lying goods are conveyed in a suspended manner by means of the conveyor bags in the overhead conveyor facility 1. In addition or alternatively, so-called hanging goods can also be loaded at the feed station 4. Hanging goods are individual goods that are conveyed in particular by being suspended from a hanger, in particular clothing.

The loading station 4 is also directly connected to the incoming goods zone 3 in terms of conveying technology. It is therefore possible to convey individual goods from incoming goods zone 3 directly to the feed station 4 or to store them in warehouse 2 and then convey them to the feed station 4.

It is also possible to design the overhead conveyor facility such that there is no conveying connection between the feed station 4 and the incoming goods zone 3 or between the feed station 4 and the warehouse 2. In this case, the individual goods are conveyed manually from the warehouse 2 or the incoming goods zone 3 or the warehouse 2 to the feed station 4, for example by means of spring floor trolleys or pallet lifting trucks.

The conveyor bags and/or the clothes hangers are conveyed separately in a rail system of the overhead conveyor facility 1 by means of a roller adapter not shown in detail in FIG. 1. The roller adapter is also referred to as an overhead adapter 13. The conveyor bags and/or the clothes hangers are conveyed in a suspended manner by means of the overhead adapter 13. The conveyor bags and/or the clothes hangers each have an identification means that is designed, for example, as an RFID chip or as an identification code, in particular as a bar code or as a QR code. In particular, an RFID chip can be arranged in an integrated manner in the overhead adapter 13.

Unique identification data is stored in the respective identification means. The identification data is also referred to as overhead adapter data. By means of the identification data, the respective overhead adapter with the individual goods conveyed in a suspended manner can be clearly identified and, in particular, controlled along the overhead conveyor facility 1. In particular, it is possible to track and control the conveying path of the individual goods along the overhead conveyor facility 1.

For suspended conveyance, the conveyor bags and/or the clothes hangers are each connected in a form-fitting manner to one of the overhead adapters 13. In particular, the conveyor bags and/or the clothes hangers each have a hook which can be fastened in a corresponding recess of the overhead adapter 13. Alternatively, the overhead adapter 13 can also be hook-shaped and, in particular, can be fastened in a recess of the conveyor bag and/or the clothes hanger.

The overhead conveyor facility 1 comprises a sorting unit 5 for sorting the individual goods, i.e. for changing the sequence of the individual goods in the flow of goods.

A buffer unit 24 is arranged upstream of the sorting unit 5, which buffer unit 24 has at least one and, in particular, a plurality of circulating storage devices 6, wherein only one single circulating storage device 6 is shown in FIG. 1 for reasons of illustration. In terms of conveying technology, the sorting unit 5 is connected to the buffer unit 24, and the buffer unit 24 is connected in terms of conveying technology to the feed station 4.

If the buffer unit 24 has a plurality of circulating storage devices 6, these are each connected in terms of conveying technology to the feed station 4, in particular independently of one another. This means that the circulating storage devices 6 are arranged parallel to each other, in particular in the conveying direction. Individual goods from the feed station 4 can be conveyed into one of the circulating storage devices 6.

The buffer unit 24 serves for intermediate buffering of the individual goods and, in particular, for combining the individual goods in the sorting device to form logical groups. In particular, the individual goods are combined into groups of individual goods that form an order. In the sorting unit 5, groups of individual goods can be formed that are part of an order. In particular, the individual goods are sorted into a required sequence in the sorting unit 5.

The overhead conveyor facility 1 includes a central control unit 7 that provides a signal connection with other components of the overhead conveyor facility 1. The signal connection can be wired or wireless. A wireless, radio-linked signal connection is shown in FIG. 1 with a symbol 8 for radio transmission.

The sorting unit 5 is connected in terms of conveying technology to at least one and in particular to a plurality of packing places 9. The individual goods of an order are conveyed from the sorting unit 5 to one of the packing places 9. At the packing places 9, the individual goods are unloaded, i.e. removed from the conveyor bags and/or the clothes hangers are removed from the overhead adapters 13 and packed, in particular manually. The individual goods are packed to singe orders and conveyed in particular by order to an outgoing goods zone 10, which is connected to the packing places 9 in terms of conveying technology.

The structure and function of the circulating storage device 6 are explained in more detail below.

The circulating storage device 6 forms an overhead conveyor system. The circulating storage device 6 has a first overhead conveyor line 11, which is designed to be linear, in particular straight, with respect to the conveying direction 12. The first overhead conveyor line 11 is designed in particular as a conveyor rail in which the overhead adapters 13 are conveyed in a suspended manner. A rail system of this type and the overhead adapters 13 conveyable therein for the overhead conveyor facility 1 are known from DE 10 2005 006 455 A1. With regard to the details of the embodiment of the overhead adapters 13 and their function for conveying along the overhead conveyor facility 1, in particular the overhead conveyor system, explicit reference is made thereto.

In particular, the first overhead conveyor line 11 is arranged to be inclined downwardly relative to the vertical along the conveying direction 12, so that the overhead adapters 13 are automatically conveyed along the first overhead conveyor line 11 due to the force of gravity along the conveying direction 12. Additionally or alternatively, the first overhead conveyor line 11 may also have a conveyor drive, not shown in more detail, to convey the overhead adapters 13 in a driven manner along the conveying direction 12. If a conveyor drive is provided, the first overhead conveyor line 11 can also be oriented horizontally or rising with respect to the horizontal.

The first overhead conveyor line 11 is followed along the conveying direction 12 by a functional overhead conveyor line 14. The functional overhead conveyor line 14 forms a functional unit of the circulating storage device 6.

The functional overhead conveyor line 14 is designed to be non-linear, in particular semicircular or U-shaped.

In particular, a conveyor drive 23 is arranged on the functional overhead conveyor line 14 to convey the overhead adapters 13 along the functional overhead conveyor line 14 in a driven manner.

The functional overhead conveyor line 14 is followed by a second overhead conveyor line 15, which is in particular designed identically to the first overhead conveyor line 11. In particular, the overhead conveyor lines 11, 15 are oriented parallel to each other. The conveying direction 12 in the region of the second overhead conveyor line 15 is oriented in particular in an antiparallel manner to the conveying direction 12 in the region of the first overhead conveyor line 11.

The second overhead conveyor line 15 is followed by a connecting overhead conveyor line 16. The connecting overhead conveyor line 16 is in particular designed to be non-linear, in particular semi-circular or U-shaped. The first overhead conveyor line 11 adjoins the connecting overhead conveyor line 16. In particular, the connecting overhead conveyor line 16 enables the overhead adapters 13 to be returned from the second overhead conveyor line 15 to the first overhead conveyor line 11. The connecting overhead conveyor line 16 is a return overhead conveyor line.

The overhead conveyor lines 11, 14, 15, 16 form the closed circulating storage device 6, which enables endless conveying of the overhead adapters 13 in the circulating storage device 6.

An insertion element 17 is arranged at the connecting overhead conveyor line 16. The insertion element 17 allows overhead adapters 13, which are conveyed in particular by the feed station 4, to be inserted into the circulating storage device 6.

A discharge element 18 is arranged on the functional overhead conveyor line 14, which enables the discharge of overhead adapters 13 from the circulating storage device 6, in particular in order to convey the discharged overhead adapters 13 to the packing places 9. The discharge element 18 is designed in particular in the form of a switchable diverter which, depending on the switch position, causes the overhead adapters 13 to be conveyed along the functional overhead conveyor line 14 or to the packing places 9.

A separating unit 19 is arranged upstream of the functional overhead conveyor line 14 and in particular between the first overhead conveyor line 11 and the functional overhead conveyor line 14. The separating unit 19 is designed to be switchable and enables overhead adapters 13 to be fed individually into the functional overhead conveyor line 14.

A first identification unit 20 is arranged upstream of the separating unit 19. The first identification unit 20 is arranged in the region of the first overhead conveyor line 11. According to the shown embodiment example, the first identification unit 20 is designed as a transponder reader. The first identification unit is suitable to detect the overhead adapter data stored in the identification means on the overhead adapter 13 in a contactless manner. In particular, it is not necessary to stop the overhead adapter 13 in the region of the first identification unit 20 to read out the data. In particular, the first identification unit 20 enables the data to be read out as the overhead adapter 13 passes by.

Along the conveying direction 12, the first identification unit 20 is arranged at an advance distance A from the separating unit 19. A so-called advance region 21 is defined between the first identification unit 20 and the separating unit 19. The advance distance A corresponds to the length of the advance region 21. The length of the advance region 21 is dimensioned in particular such that a plurality of overhead adapters 13 can be arranged in the advance region, that is, a plurality of overhead adapters 13 can be arranged between the first identification unit 20 and the separating unit 19.

The length of the advance region 21 is in particular dimensioned such that a plurality of overhead adapters 13, in particular at least five overhead adapters 13, in particular at least ten overhead adapters 13, in particular at least twenty overhead adapters 13 and in particular at least fifty overhead adapters 13 can be arranged between the first identification unit 20 and the separating unit 19. It is advantageous if the first identification unit 20 can be fixed in a variable position along the first overhead conveyor line 11, so that in particular the length of the advance region 21 can be set in a variably fixable manner.

A second identification unit 22 is arranged downstream of the separating unit 19. The second identification unit 22 is designed in particular identically to the first identification unit 20. The second identification unit is arranged in the region of the functional overhead conveyor line 14. The second identification unit 22 is arranged in particular between the separating unit 19 and the discharge element 18.

In particular, the control unit 7 is in signal connection, in particular bidirectional signal connection, with the discharge element 18, the separating unit 19 and the identification units 20, 22.

A method for conveying the overhead adapters 13 into the circulating storage device 6 is explained in more detail below with reference to FIGS. 1 and 2.

Individual goods are fed from the feed station 4 to the circulating storage device 6 via the insertion element 17, either suspended on clothes hangers or in a conveyor bag on the overhead adapters 13. The overhead adapters 13 are conveyed along the first overhead conveyor line 11 and accumulated at the separating unit 19.

Before the overhead adapters 13 arrive at the separating unit 19, they pass through the first identification unit 20. In doing so, the overhead adapters 13 are identified by means of the identification means located thereon, i.e., the overhead adapter data is read out and a corresponding first identification signal is generated in the identification unit. The first identification signal is transmitted from the first identification unit 20 to the control unit 7. Depending on whether the overhead adapters 13 that have passed the first identification unit 20 are assigned to a current order, i.e. are to be discharged from the circulating storage device 6, a corresponding control signal is generated in the control unit 7.

A first control signal is generated if at least one overhead adapter 13 to be discharged is located in the advance region 21. A second control signal is generated if there is no overhead adapter 13 to be discharged in the advance region 21. According to the illustration in FIG. 1, there are no overhead adapters 13 to be discharged in the advance region 21. Consequently, the second control signal is generated according to the arrangement in FIG. 2.

The second control signal is transmitted from the control unit 7 to the separating unit 19. The separating unit 19 separates the overhead adapters 13 with a second conveying distance $d_2$. Since the overhead adapters 13 identified by means of the second identification unit 22 do not have to be discharged, the second conveying distance $d_2$ can be chosen comparatively small. This means that the overhead adapter density along the functional overhead conveyor line 14 is comparatively high. In the event that no overhead adapters 13 are provided in the advance region 21 for a discharge process, the individual goods can be conveyed at a comparatively high conveying rate.

In particular, the control unit 7 transmits a deactivation signal to the second identification unit 22. The deactivation signal is generated in particular in an automated manner in the control unit 7 if no overhead adapter 13 to be discharged is arranged in the advance region 21. In particular, the deactivation signal is generated in conjunction with the second control signal, in particular before, simultaneously with or after it. Since it is not intended to discharge overhead adapters 13 from the circulating storage device 6, the second identification unit 22 can be deactivated. The risk of unintentionally discharging overhead adapters 13 is prevented if the second identification unit 22 is deactivated.

If the first identification unit 20 identifies an overhead adapter 13 that is to be discharged, in particular because it belongs to an order that is intended for picking, a corresponding identification signal is generated so that the control unit generates the first control signal and transmits same to the separating unit 19. Based on the first control signal, the overhead adapters 13 are separated by the separating unit 19 with a first conveying distance $d_1$, which is in particular greater than the second conveying distance $d_2$. The second conveying distance $d_2$ is in particular at most 70% of the first conveying distance $d_1$, in particular at most 60%, in particular at most 50%, in particular at most 40%, in particular at most 30% and in particular at most 20%. The second conveying distance $d_2$ corresponds to a minimum conveying distance drain, which is required in order to reliably discharge the overhead adapter 13 to be discharged from the overhead conveyor system 6, i.e. the circulating storage device 6, by means of the discharge element 18, in particular without collision.

The mode of the overhead conveyor system 6 in which the separating unit 19 has changed the separation from the previously smaller second conveying distance $d_2$ to the now larger first conveying distance $d_1$ is illustrated in FIG. 2.

Since the overhead adapters 13 fed to the functional overhead conveyor line 14 are now at least partially intended for discharge, the second identification unit 22 is activated again. For this purpose, the control unit 7 transmits an activation signal to the second identification unit 22, in particular when the first control signal is generated in the control unit 7.

The overhead conveyor system 6 according to the invention can be operated in two different modes. In the first mode according to FIG. 1, in which no discharge of overhead adapters 13 from the overhead conveyor system 6 is provided, the overhead adapters 13 can also be conveyed in the region of the functional overhead conveyor line 14 at a small conveying distance $d_2$, in particular at a minimum conveying distance $d_{min}$. In this mode, the circulating storage device 6 enables a high conveying rate.

In the second mode according to FIG. 2, it is ensured that the conveying distance $d_1$ between the overhead adapters 13 is large enough to ensure reliable discharge of the overhead adapters 13 from the circulating storage device 6 by means of the discharge element 18.

In this context, it is essential that the separating unit 19 allows the separation distance, i.e. the conveying distance between the overhead adapters 13, to be set variably. By means of the first identification unit 20, overhead adapters 13 that are to be discharged later are detected at an early stage to enable the conveying distance to be varied via the separating unit 19.

It is advantageous if, in particular, when an initially last overhead adapter 13 has been discharged, there is a switch back from the second mode according to FIG. 2, in particular in an automated manner, to the first mode according to FIG. 1. It is thus possible to operate the overhead conveyor facility 1 and in particular the overhead conveyor system 6 at the highest possible throughput rate, i.e. conveying rate.

A switching back, in particular in an automated manner, from the second mode to the first mode is possible, for example, by the identification units 20, 22 accessing a list that is kept in the control unit 7. As soon as the first identification unit 20 identifies an overhead adapter 13 to be discharged, the latter is entered in the list. When this overhead adapter 13 passes the second identification unit 22 and is identified there, this overhead adapter 13 is deleted from the list again. This means that the overhead conveyor system 6 is always operated in the second mode, i.e. with increased conveying distance $d_1$, if the list has at least one entry. As soon as the list is empty, i.e. has no entry, there is an automatic switchover to the first mode with the minimum conveying distance drain.

What is claimed is:

1. An overhead conveyor system for conveying overhead adapters along a conveying direction, comprising
   a. a first overhead conveyor line,
   b. a functional overhead conveyor line connected in terms of conveying technology to the first overhead conveyor line and having a discharge element for discharging overhead adapters from the overhead conveyor system,
   c. a separating unit arranged upstream of the functional overhead conveyor line for feeding the overhead adapters separately into the functional overhead conveyor line,
   d. a first identification unit arranged upstream of the separating unit for identifying overhead adapters to be discharged,
   e. a second identification unit arranged downstream of the separating unit for identifying overhead adapters to be discharged,
   f. a control unit for automatically conveying and discharging the overhead adapters, wherein the control unit is in signal connection with the discharge element, the first identification unit, the second identification unit and the separating unit,
   wherein the separating unit is switchable by means of the control unit such that a conveying distance oriented along the conveying direction between two adjacent overhead adapters can be set variably, wherein in the event that no overhead adapters to be discharged have been identified by the first identification unit, the conveying distance between two adjacent overhead adapters is set to a conveying distance that is smaller than a required minimum conveying distance needed for discharging individual overhead adapters, wherein in the event that at least one overhead adapter to be discharged has been identified by means of the first identification unit, the overhead adapters are subsequently separated at the required minimum conveying distance by means of the separating unit and conveyed in the functional overhead conveyor line.

2. The overhead conveyor system according to claim 1, wherein the overhead conveyor system is designed as a circulating storage device.

3. The overhead conveying system according to claim 1, comprising a second overhead conveyor line which is connected in terms of conveying technology to the functional overhead conveyor line and which is connected in terms of conveying technology to the first overhead conveyor line.

4. The overhead conveying system according to claim 1, comprising a second overhead conveyor line which is connected to the functional overhead conveyor line and which is connected to the first overhead conveyor line by means of a connecting conveyor line.

5. The overhead conveyor system according to claim 1, comprising an insertion element for inserting overhead adapters into the overhead conveyor system.

6. The overhead conveyor system according to claim 5, wherein the insertion element is arranged on a connecting conveyor line.

7. The overhead conveyor system according to claim 1, comprising an advance region of the first overhead conveyor line, which advance region is arranged between the first identification unit and the separating unit, wherein the advance region has a length along the conveying direction such that a plurality of overhead adapters can be arranged simultaneously in the advance region.

8. The overhead conveyor facility comprising at least one overhead conveyor system according to claim 1.

9. A method for conveying overhead adapters in an overhead conveyor system along a conveying direction, comprising the method steps of
    suspended conveyance of at least one overhead adapter along a first overhead conveyor line of the overhead conveyor system,
    identifying overhead adapters to be discharged by means of a first identification unit,
    transmitting a first identification signal from the first identification unit to a control unit,
    generating a control signal by means of the control unit, wherein
        a first control signal is generated when at least one overhead adapter to be discharged has been identified by means of the first identification unit,
        a second control signal is generated if no overhead adapter to be discharged has been identified by means of the first identification unit,
    transmitting the control signal from the control unit to a separating unit,
    separating the overhead adapters by means of the separating unit, wherein a conveying distance between two adjacent overhead adapters is set in dependence on the control signal such that a first conveying distance due to the first control signal is greater than a second conveying distance due to the second control signal,
    identifying overhead adapters to be discharged by means of a second identification unit,
    transmitting a second identification signal from the second identification unit to the control unit,
    generating a discharge signal by means of the control unit when an overhead adapter to be discharged has been identified by means of the second identification unit,
    transmitting the discharge signal from the control unit to a discharge unit,
    discharging the overhead adapter to be discharged from the overhead conveyor system by means of a discharge element.

10. The method according to claim 9, wherein overhead adapter data is detected by means of the identification units in a contactless manner.

11. The method according to claim 10, wherein the detection of the overhead adapter data is performed while passing by.

12. The method according to claim 9, wherein the overhead adapters can be conveyed in a circulating manner in the overhead conveyor system.

13. The method according to claim 9, wherein the overhead adapters can be conveyed endlessly in the overhead conveyor system.

14. The method according to claim 9, comprising deactivating the second identification unit by transmitting a deactivation signal from the control unit to the second identification unit when the first control signal is generated.

15. The method according to claim 9, wherein the overhead adapter to be discharged is included in a list with the first control signal and is removed from this list again when the overhead adapter has been identified by means of the second identification unit.

16. The method according to claim 15, comprising automatically generating the second control signal when the last overhead adapter has been removed from the list.

17. An overhead conveyor system for conveying overhead adapters along a conveying direction, the overhead conveyor system comprising:
    an overhead conveyor line;
    a functional overhead conveyor line operatively connected to the overhead conveyor line, the functional overhead conveyor line comprising a discharge unit for discharging overhead adapters from the overhead conveyor system;
    a separating unit arranged upstream of the functional overhead conveyor line for feeding the overhead adapters separately into the functional overhead conveyor line;
    a first identification unit arranged upstream of the separating unit for identifying overhead adapters to be discharged;
    a second identification unit arranged downstream of the separating unit for identifying overhead adapters to be discharged; and
    a control unit configured to control conveying of the overhead adapters and to control discharging of the overhead adapters,
    wherein the separating unit is switchable by means of the control unit such that a conveying distance oriented along the conveying direction between two adjacent overhead adapters can be set variably, and the separating unit is configured to set a first conveying distance based on a first control signal and to set a second conveying distance based on a second control signal with the first conveying distance being greater than the second conveying distance,
    wherein the control unit is configured to generate the first control signal upon the first identification unit identifying an overhead adapter to be discharged and is configured to generate the second control signal upon the first identification unit identifying an overhead adapter not to be discharged and to transmit the first control signal from the control unit to the separating unit and to transmit the second control signal from the control unit to the separating unit, wherein the control unit is configured to generate a discharge signal when the overhead adapter to be discharged has been identified by the second identification unit and to transmit the discharge signal from the control unit to the discharge unit, whereby the overhead adapter to be discharged from the overhead conveyor system is discharged by the discharge unit.

18. The overhead conveyor system according to claim 17, wherein the overhead conveyor system is configured as a circulating storage device.

19. The overhead conveying system according to claim 17, wherein the overhead conveyor line is a first overhead conveyor line and further comprising a second overhead conveyor line which is operatively connected to the functional overhead conveyor line and is operatively connected to the first overhead conveyor line.

20. The overhead conveying system according to claim 17, wherein the overhead conveyor line is a first overhead conveyor line and further comprising a second overhead conveyor line and a connecting conveyor line wherein the second overhead conveyor line is connected to the functional overhead conveyor line and the second overhead conveyor line is connected to the first overhead conveyor line by the connecting conveyor line.

* * * * *